US008682826B2

(12) United States Patent
Dolan et al.

(10) Patent No.: US 8,682,826 B2
(45) Date of Patent: Mar. 25, 2014

(54) NEWS TOPIC-INTEREST-BASED RECOMMENDATIONS TWIDDLING

(75) Inventors: Peter Dolan, San Francisco, CA (US); Jiahui Liu, Mountain View, CA (US)

(73) Assignee: Google Inc., Mountain View, CA (US)

( * ) Notice: Subject to any disclaimer, the term of this patent is extended or adjusted under 35 U.S.C. 154(b) by 46 days.

(21) Appl. No.: 13/556,043

(22) Filed: Jul. 23, 2012

(65) Prior Publication Data

US 2012/0290522 A1  Nov. 15, 2012

(51) Int. Cl.
*G06F 17/00* (2006.01)
*G06F 9/44* (2006.01)
*G06F 7/00* (2006.01)
*G06N 99/00* (2010.01)
*G06N 5/04* (2006.01)
*G06F 17/30* (2006.01)
*G06F 21/62* (2013.01)

(52) U.S. Cl.
CPC .............. *G06N 99/005* (2013.01); *G06N 5/048* (2013.01); *G06F 17/30864* (2013.01); *G06F 21/6218* (2013.01)
USPC ............... 706/45; 706/52; 707/736; 707/758; 707/781

(58) Field of Classification Search
None
See application file for complete search history.

(56) References Cited

U.S. PATENT DOCUMENTS

2002/0099763 A1* 7/2002 Kondo et al. ................. 709/201
2005/0076093 A1   4/2005 Michelitsch et al.
2009/0248599 A1  10/2009 Hueter et al.

* cited by examiner

*Primary Examiner* — Alan Chen
(74) *Attorney, Agent, or Firm* — Morgan, Lewis & Bockius LLP

(57) ABSTRACT

A method includes: obtaining first click distribution data for a first subset of a plurality of media items, each of which is associated with one or more item categories, determining from the first click distribution data likelihood of a generic user selecting media items associated with at least a subset of the item categories, obtaining second click distribution data from a particular user for a second subset of the plurality of media items, determining, based on differences between the first and second click distribution data, an adjusted likelihood of the particular user selecting media items associated with the at least a subset of the item categories, and transmitting, based on the adjusted likelihood, to a client device associated with the particular user recommendations related to a third subset of the plurality of media items and respective item categories thereof.

20 Claims, 13 Drawing Sheets

Community Statistics Database 118

Community Statistics for 2009 232

| Category 214 | Previous Week 275 | Previous Month 276 | ... |
|---|---|---|---|
| Health 214-1 | 25 | 40 | ... |
| Sports 214-2 | 10 | 15 | ... |
| ... | | | |
| Category ID 214-Y | Click data 223-Y | Click data 224-Y | ... |

Community Statistics Database
118

Community Click Distribution for 2009
240

| Category | August | June | May | ... |
|---|---|---|---|---|
| Health 214-1 | 5% | 5% | 5% | ... 281-1 |
| Sports 214-2 | 5% | 50% | 50% | ... 281-2 |
| ... | | | | |
| Category ID 214-Y | Click distribution 236-Y | Click distribution 237-Y | Click distribution 238-Y | ... 281-F |

FIGURE 2E

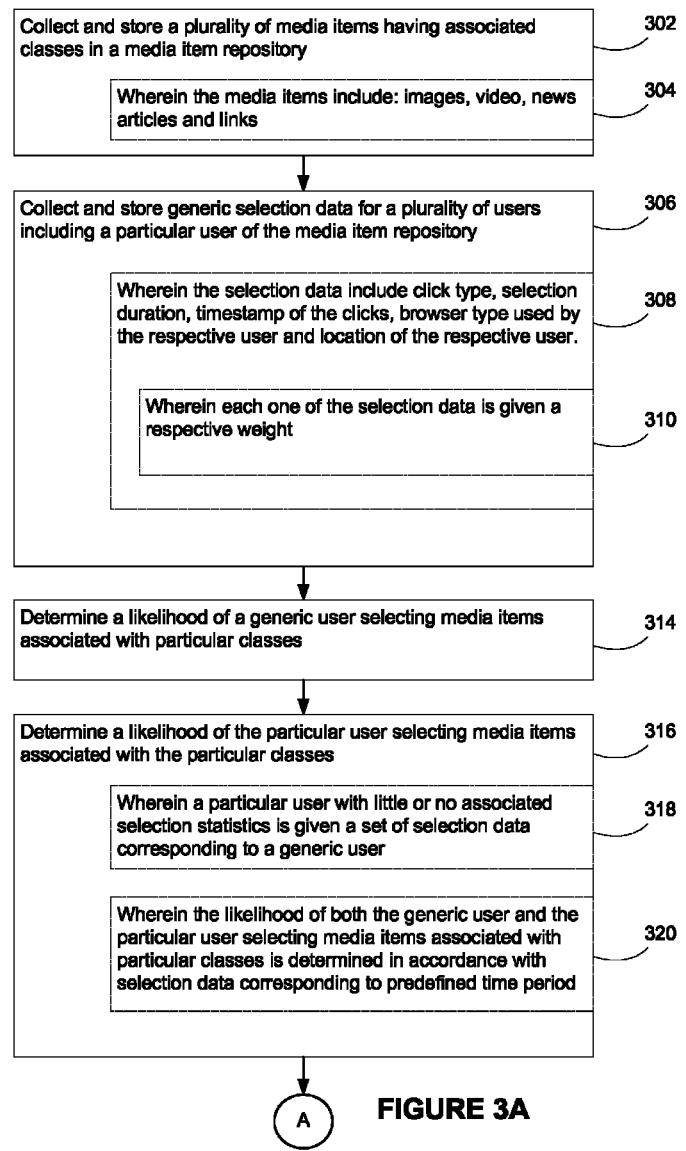

NEWS TOPIC-INTEREST-BASED RECOMMENDATIONS TWIDDLING

RELATED APPLICATIONS

This application is a continuation of, and claims priority to U.S. application Ser. No. 12/562,953, filed Sep. 18, 2009, entitled "news topic-interest-based recommendation twiddling," which is hereby incorporated by reference in its entirety.

TECHNICAL FIELD

The present invention relates generally to predicting a computer user's interests and recommending information to the computer user based on the computer user's predicted interests.

BACKGROUND

News items are commonly distributed and consumed through online news services. Online news services seek to recommend news items that users are likely to be interested in and therefore likely to view. Typically, popular news items are recommended to users. However, popularity alone may not accurately reflect a user's interest and thus may not accurately predict what items a user will select to view.

News items can also be recommended based on a user's selection history. However, recommending news items solely on a user's selection history fails to account for news trends. For example, during the Olympics, a user may have many selections for sports related items but the user may not have a strong preference for sports. On the other hand, the user may want to view sports related items for exceptional sporting events such as the Olympics.

It would be highly desirable to predict a user's news interest by considering a user's selection history of news items relative to the selections made by a community of users.

SUMMARY

In some embodiments, a system and method are provided to provide personalized news recommendations based on a prediction of a user's interests. The prediction of the user's interest is based on the user's selection history and the selection history of a community of users or general population. This enables a user to receive news recommendations for news items in the categories the user has a strong interest in and news recommendations for news items that are very popular with the general population. For example, a user may have little or no interest in sports related news items except for exceptional events such as the Olympics. In the example, the user would receive news recommendations for exceptional sporting events such as the Olympics that score high enough with the general population.

In some embodiments, a method includes: at a server system, obtaining first click distribution data for a first subset of a plurality of media items, each of the media items being associated with one or more item categories, determining, from the first click distribution data, likelihood of a generic user selecting media items associated with at least a subset of the item categories, obtaining second click distribution data from a particular user for a second subset of the plurality of media items, determining, based on differences between the first and second click distribution data for respective item categories, an adjusted likelihood of the particular user selecting media items associated with the at least a subset of the item categories, and transmitting to a client device associated with the particular user recommendations related to a third subset of the plurality of media items based on the adjusted likelihood and respective item categories of the third subset of the plurality of the media items.

BRIEF DESCRIPTION OF THE DRAWINGS

FIGS. 2A-2E depict data structures associated with various components of the client-server environment according to some embodiments of the invention.

FIGS. 3A-3C are flow chart diagrams illustrating a process of recommending media items in accordance with some embodiments of the invention.

Like reference numerals refer to corresponding parts throughout the drawings.

DESCRIPTION OF EMBODIMENTS

Methods and systems for recommending media items are described. Reference will be made to certain embodiments of the invention, examples of which are illustrated in the accompanying drawings. While the invention will be described in conjunction with the embodiments, it will be understood that it is not intended to limit the invention to these particular embodiments alone. On the contrary, the invention is intended to cover alternatives, modifications and equivalents that are within the spirit and scope of the invention as defined by the appended claims.

Moreover, in the following description, numerous specific details are set forth to provide a thorough understanding of the present invention. However, it will be apparent to one of ordinary skill in the art that the invention may be practiced without these particular details. In other instances, methods, procedures, components, and networks that are well known to those of ordinary skill in the art are not described in detail to avoid obscuring aspects of the present invention.

The term "media item" as used throughout this specification refers to any document, links to documents, service or content of any format including, but not limited to, text, image, audio, video, etc., that may be used by a web browser or other applications.

Figure 1:
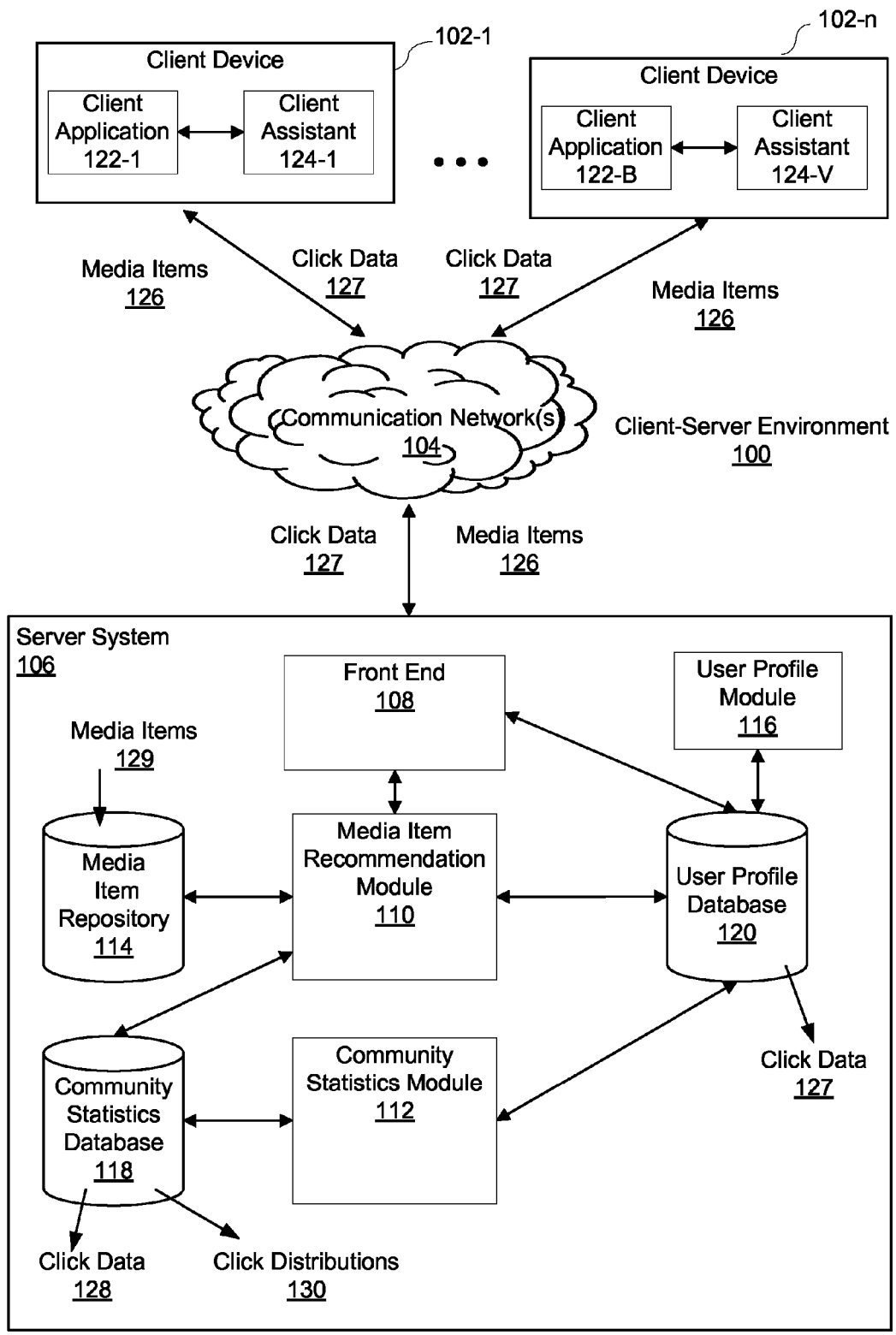
FIG. 1 is a block diagram illustrating the infrastructure of a client-server environment in accordance with some embodiments of the invention.

FIG. 1A is a block diagram illustrating the infrastructure of a client-server environment 100 for implementing some of the embodiments of the invention. The client-server environment 100 includes: one or more client devices 102, a communication network 104 and a server system 106. The server system 106 is coupled to one or more client devices 102 by the communication network(s) 104.

The communication network(s) 104 can be any wired or wireless local area network (LAN) and/or wide area network (WAN), such as an intranet, an extranet, or the Internet. It is sufficient that the communication network 104 provides communication capability between the client devices 102 and the server system 106. In some embodiments, the communication network 104 uses the HyperText Transport Protocol (HTTP) to transport information using the Transmission Control Protocol/Internet Protocol (TCP/IP). HTTP permits the client devices 102 to access various resources available via the communication network 104. The various embodiments of the invention, however, are not limited to the use of any particular protocol.

In some embodiments, the server system 106 may include a front end 108, a media item recommendation module 110, a media item repository 114, a community statistics module 112, a community statistics database 118, a user profile module 116 and a user profile database 120. The server system 106 receives requests for media items (e.g., 129) from a user of a client device 102, determines a collection of media items 126 that the user is likely to be interested in, and sends the collection of media items 126 to the user of the client device 102. The server system 106 also receives and stores click data 127, media items 129 and links to media items.

It should be appreciated that the server system 106 may be implemented as a distributed system of multiple computers. However, for convenience of explanation, the server system 106 is described below as being implemented on a single computer, which can be considered a single logical system.

The click data (e.g., 127, 1128) refers to any type of information that can be determined from user selections (i.e., clicks). The click data (e.g., 127, 128) includes selection duration (amount of time between user selection of a URL link and user exiting the document), the time at which the click occurred, the type of browser used to view the content clicked on, the location of the user performing the click (e.g., through the IP address of the user), the URL or name of the item clicked on and the type of click (search click or browse click). A search click is a click on a search result. A browse click is a click on any item that is not included in a search result. In an alternate embodiment, click data includes click positions (e.g., the position of the item in the search result).

In some embodiments the click data (e.g., 127, 128) may include those clicks where a user accessed a respective document for at least a pre-determined time interval. In this regard, the use of the pre-determined time interval may allow the system 106 to distinguish between so-called good clicks (the user access a document that he or she may currently be interested in) and so-called bad clicks (the user inadvertently accesses a document that he or she may not currently be interested in). Thus, the pre-determined time interval may provide a way to filter out such bad clicks from the click data (e.g., 127, 128).

The front end 108 provides an interface between the server system 106 and the client devices 102. The front end 108 is configured to receive click data 127 from the client devices 102 and media items 129 from other server systems or other client devices 102. In some embodiments, the click data 127 is stored in the user profile database 120. The front end 108 is also configured to receive requests for media items and to send media items 126 to the client devices 102. In some embodiments, the front end 108 sends a feed of media items 126 to the client devices 102. Optionally, the front end 108 is configured to send links to media items 126 to the client devices 102.

Figure 2A:
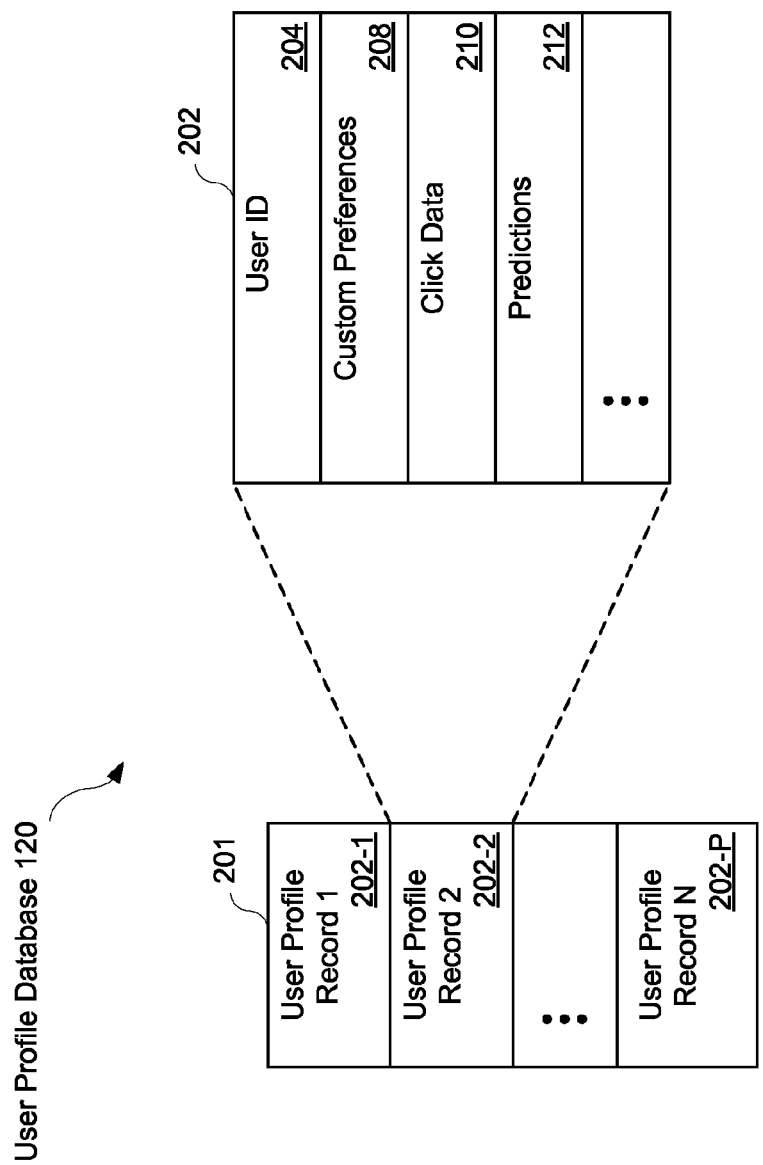

The user profile database 120 stores a plurality of profiles, each profile storing for a respective user (or group of users), click data (e.g., 210, FIG. 2A), custom preferences (e.g., 208, FIG. 2A) and a user/group id (e.g., 204, FIG. 2A). In some embodiments, a profile corresponds to a group of users organized by some criteria, such as users who consume media items in a particular language, (e.g., English, Japanese, Chinese, French, German, etc.), users from a particular geographical location (e.g., city, state, country or region), users having IP addresses within a certain range, users using a certain device (e.g., netbook, mobile phone, desktop, tablet, laptop), or any suitable combination of such criteria.

Optionally, a respective user or group profile includes a set of predictions (e.g., 212, FIG. 2A). The set of predictions includes a list of categories and for each category the likelihood that the user will view items associated with the category. For example, a user may be likely to select health related media items 60% of the time.

A category refers to a division or class of media items (e.g., news, sports, travel, finance). In some embodiments, the categories are also related to specific groups of users for example by geographic location or language. For example, there may be a news category for Germans speakers and a news category for French speakers. Each media item (e.g., 126, 129) can be associated with one or more categories. For example, one web page may have a category of sports and entertainment. In some embodiments, a category refers to a type of media item (e.g., article, video or sound recording).

The user profile module 116 creates and maintains at least some user profiles for users of the server system 106 and stores the profiles in the user profile database 120. As described in more detail below, the media item recommendation module 110 in part uses the click data 127 for a respective user stored in the user profile database 120 to determine a set of media items 126 to recommend to a user.

The community statistics database 118 stores click data 128 and click distributions 130 for a community of users. A click distribution is the percentage of total clicks for each category. For example, 10% of the clicks from a community of users may have been for media items in the category of health and 90% of the clicks may have been for media items in the category of sports.

The community of users consists of a group of users organized by some criteria, such as users who consume media items in a particular language, (e.g., English, Japanese, Chinese, French, German, etc.), users from a particular geographical location (e.g., city, state, country or region), users have IP addresses within a certain range, users using a certain device (e.g., netbook, mobile phone, desktop, tablet, laptop), or any suitable combination of such criteria. In some embodiments, the server system 106 includes multiple community statistics databases 118, or the community statistics database 118 is partitioned, with each partition or database storing records corresponding to a respective community of users. The community statistics module 112 creates and maintains at least some of the click data 128 and the click distributions 130 for users of the server system 106. For each category, the community statistics database 118 stores click data 128 and click distributions 130. In some embodiments, the community statistics database 118 stores multiple sets of statistics each set corresponding to a predefined period of time such as a an hour, day, week, month or year. As described in more detail below, the media item recommendation module 110 in part uses the click data 128 and the click distributions 130 stored in the community statistics database 118 to determine a set of media items 126 that the user is likely interested in.

The media item recommendation module 110 is configured to use the click data 127 stored in the profile database 120, the click distributions 130 and the click data 128 from the community statistics database 118 to determine the relatively likelihood of a particular user selecting media items (e.g., 126, 129) associated with particular categories as compared to a generic user. In some embodiments, the relatively likelihoods or predictions are stored in the particular user's profile (212, FIG. 2B). The media item recommendation module 110 determines a set of media items 126 from the media item repository 114 based on the relative likelihood and sends the media items 126 to the particular user by way of the front end 108.

The media item repository 114 stores the media items 129 including but not limited to news articles, blog postings, videos, images and sound recordings. Optionally, the media item repository 114 also stores links to news articles, links to blog postings, links to videos, links to image and links to sound recordings. In some embodiments, the media item repository 114 stores both metadata (e.g., title, description, URL, date/time, and possibly other metadata) and the content of each media item. In some embodiments, the media item repository 114 stores the metadata but not the content for each content item. In some embodiments, the media item repository 114 stores the location of one or more content feeds.

A content feed is a resource or service that provides a list of content items that are present, recently added, or recently updated at a feed source. A content item in a content feed may include the content associated with the item itself (the actual content that the content item specifies), a title (sometimes called a headline), and/or a description of the content, a network location or locator (e.g., URL) of the content, or any combination thereof. For example, if the content item identifies a text article, the content item may include the article itself inline, along with the title (or headline), and locator. Alternatively, a content item may include the title, description and locator, but not the article content. Thus, some content items may include the content associated with those items, while others contain links to the associated content but not the full content of the items. A content item may also include additional metadata that provides additional information about the content. For example, the content item may include an associated timestamp or date. The full version of the content may be any machine-readable data, including but not limited to web pages, images, digital audio, digital video, Portable Document Format (PDF) documents, and so forth.

In some embodiments, a content feed is specified using a content syndication format, such as RSS. RSS is an acronym that stands for "rich site summary," "RDF site summary," or "Really Simple Syndication." "RSS" may refer to any of a family of formats based on the Extensible Markup Language (XML) for specifying a content feed and content items included in the feed. In some other embodiments, other content syndication formats, such as the Atom syndication format or the VCALENDAR calendar format, may be used to specify content feeds.

A user interfaces with the server system 106 and views media items 126 at a client device 102. The client device 102 may be any suitable computer devices that are capable of connecting to the communication network 104, such as computers, desktop computers, laptop computers, tablet devices, internet kiosks, personal digital assistants, cell phones, gaming devices, or any other device that is capable of receiving documents, content feeds and links from the server system 106. The client device 102 typically includes one or more processors, non-volatile memory such as a hard disk drive and a display. The client device 102 may also have input devices such as a keyboard and a mouse.

A respective client 102 may contain at least one client application 122 for receiving media items 126 from the server system 106. The client application 122 can be a software application that permits a user to interact with the client 102 and/or network resources to perform one or more tasks. For example, the client application 122 can be a browser (e.g., Google Chrome) or other type of application that permits a user to search for, browse, and/or use resources (e.g., web pages and web services) identified by a URL (universal resource locator). Similarly, the term "URL" means a network address or location of a media item.

In some embodiments, the client application 122 may be a feed reader. The user may create a list of feed subscriptions using the feed reader. In some embodiments, the list of feed subscriptions is stored with the user's profile in the user profile database 120.

In some embodiments, the client 102 includes one or more client assistants 124. The client assistant 124 can be a software application that performs one or more tasks related to monitoring a user's activities with respect to the client application 122, searching or browsing for resources (e.g., files) hosted by a website and processing information received from or being sent to the server system 106. The client assistant 124 can be part of the client application 122, for instance a plug-in to the client application 122 (provided, for example, from various online sources), or provided as a stand-alone program. In particular, the client assistant 124 may be embedded in one or more web pages downloaded to the client 102 from a remote server. The client assistant 124 can include JavaScript instructions embedded in the one or more web pages, and those JavaScript instructions can be executed by the client 102 in an environment (e.g., a virtual machine environment or program interpreter) provided by the client application 122.

Attention is now directed towards FIG. 2A, which illustrates a user profile data structure 201, stored in the user profile database 120, in accordance with some embodiments. The user profile data structure 201 includes a plurality of user profile records 202-1 to 202-P, each of which contains information related to the selection history of a particular user (or group of users). In some embodiments, each user profile record 202 includes: a user ID 204, custom preferences 208 (e.g., number of media items to present, content feed subscription list) and click data 210. Optionally, each user profile record 202 includes a set of predictions 212. In some embodiments, a respective profile record 202 represents a group of people organized by some criteria such as by geographic locations, users who speak a particular language languages (e.g., English, Japanese, Chinese, French, German, etc.), users having IP addresses within certain ranges, users using a certain device (e.g., netbook, mobile phone, desktop, tablet, laptop), or any combination of information that can be inferred from a user's profile.

Figure 2B:
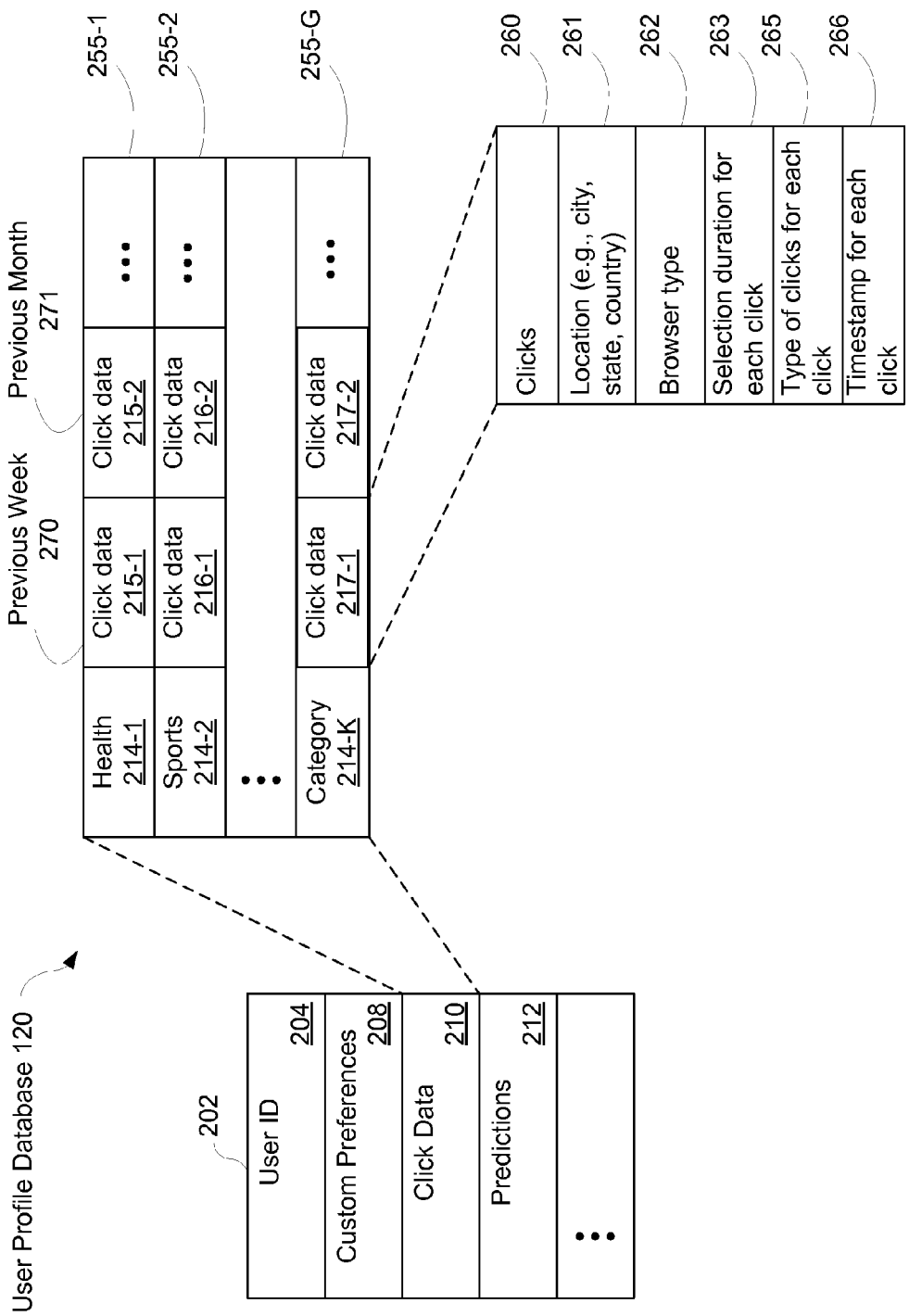

As shown in FIG. 2B, a user profile 202 stores click data 210 for one or more categories 214 during a predefined period of time (270, 271). The period of time (270, 271) can be any period of time such as hours, days, weeks months or years. The click data 217 includes clicks 260, location of the user at the time each click was made 261, the type of the user's browser or application 262 used for each click, the selection duration (amount of time between user selection of a URL link and user exiting the document) 263 for each click, type of clicks 265 (search click or browse click) for each click and timestamp of each click 266.

In some embodiments, the clicks 260 include the total number of clicks for the respective category 214 during a predefined period of time. For example, for the category of Sports, a user may have had a total of 25 clicks in the past week. In an alternate embodiment, clicks 260 includes the URL or name of each media item (e.g., 126, 129) selected.

In some embodiments, the location 261 includes the location of each item selected during a predefined period of time. In an alternate embodiment, the location 261 includes counts for each location a user may have selected items from. For example, a user may have selected 10 items while in California during the past week. In some embodiments, the location 261 includes a distribution for each location. For example, a user may have made 85% of his/her selections while the user was in California and 15% of his/her selection while the user was in Oregon during the past week.

In some embodiments, the browser type 262 includes, for each browser used by the user, the number of times the browser was used to make a selection for a predefined period of time. For example, Google Chrome may have been used for 10 of the user's clicks during the past week. In some embodiments, the browser type 262 includes a distribution for each browser used by the user. For example, Google Chrome may have been used for 15% of the user's clicks.

In some embodiments, the selection duration 263 includes the total amount of time of the user's selections for media items associated with a category 214 during a predefined period of time. For example, a user may have spent a total of 30 minutes viewing sports related items in the past week. Optionally, the selection duration 263 stores the average amount of time the user spends viewing each item. For example, a user may spend an average of 30 seconds viewing media items he/she has selected.

In some embodiments, the timestamp 266 includes the time at which each media item was selection. In some embodiments, the timestamp 266 contains distribution of the user's selections over a predefined period of time. For example, a user may make 80% of their selections during the morning, 10% of their selections in the afternoon and 10% of their selections in the evening. In another example, a user may make 50% of their selections on the weekend and 25% of their selections Monday and Tuesday and 25% of their selections on Wednesday.

Figure 2C:
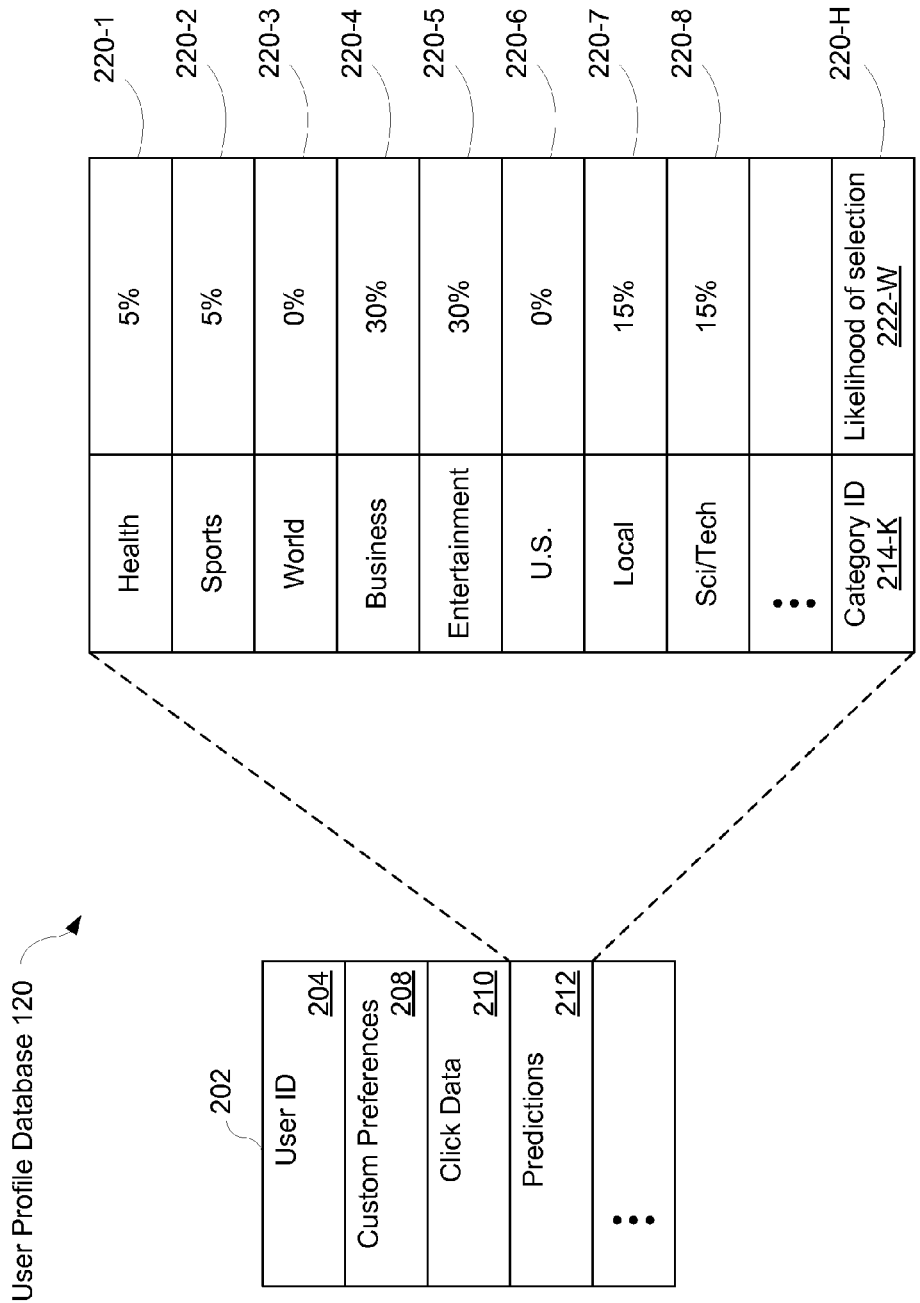

As shown in FIG. 2C, the user profile record 202 includes a set of predictions 212 for each category 214, according to some embodiments. For example, a user is likely to select Health related media items 5% of the time (220-1). The media item recommendation module 110 uses click data 127 from the user profile database 120, click data 128 and click distributions 130 from the community statistics database 112 to generate the set of predictions 212 for a respective user. In an alternate embodiment, the set of predictions 212 are generated by the media item recommendation module 110, used and then disposed of without storing the predictions in the user profile 202.

At the client 102, the client assistant 124 monitors the user's click data 127 such as the links clicked on by a respective user at a respective time from a respective location. In some embodiments, the client assistant 124 monitors different types of click data 127 including: search clicks, browse clicks, selection duration, click positions, time of the clicks, users browser type and the location of the user at the time of the click (e.g., user's IP address). The user's click data 127 is sent back to the server system 106 and stored in the user's profile 202 in the user profile database 120.

FIG. 2D illustrates a community statistics data structure 232 for storing the click data 128 for a community of users. The community statistics data structure 232 can store click data 128 for any predefined period of time. The click data 128 can be any type of click data previously discussed. For example, for the category of Sports 214-2, the community statistics data structure 232 may store click counts 280-2 corresponding to a predefined period of time such as the previous week 275 and previous month 276. The time period can be any period of time such as days, weeks, months or years. The community of users can be any group of users of the server system 106. Groups of users could be organized by some criteria such as geographic locations, languages (e.g., English, Japanese, Chinese, French, German, etc.), IP ranges and users using a certain device (e.g., netbook, mobile phone, desktop, tablet, laptop), or any suitable combination of such criteria. In some embodiments, the community statistics module 118 uses click data 127 from a plurality of user profiles to generate community statistics data structure 232.

FIG. 2E illustrates a community click distribution data structure 240 that stores click distributions 130 for a community of users. The community click distribution data structure 240 can store click distributions 130 for any predefined period of time. The click distributions 130 can be for any type of click (127, 128) data previously discussed. For example, 5% of the community of user's clicks may have been for Health 214-1 related items for the month of August. The click distributions (281-1, 281-2, 281-F) can correspond to any predefined period of time such as a hours, days, weeks, months or years. In some embodiments, the media item recommendation module 110 uses profile information stored in user profile database 120 to generate the community click distribution data structure 240. In an alternate embodiment, the media item recommendation module 110 uses click data 128 stored in the community statistics data structure 232 to generate community click distribution data structure 240. In some embodiments, the media item recommendation module 110 generates community click distribution data structures 240, uses them and then disposes of it without storing the data structure in the community statistics database 118. Optionally, the data structure 240 is generated in response to a client's request for media items.

Attention is now directed towards FIG. 3A which illustrates a process for sending recommended media items 126 to a user of a client device 122 according to some embodiments of the invention. A plurality of media items 129 having associated classes is collected and stored in a media item repository (302). A collection of media items 126 will be selected from the media items 129 stored in the media item repository 114 and recommended to a user. The media items (e.g., 126, 129) can be any piece of information that is accessible via a Uniform Resource Locator (URL) and can be, for example, a web page, a document, a database, an image, a video, or a sound recording (304). Each media item (e.g., 126, 129) can be associated with one or more categories. Each category can be associated with one or more topics, geographic locations, languages, devices, or any suitable combination of such criteria. In some embodiments, the media item repository 114 also stores links to media items (e.g., 126, 129) stored on other servers. In some embodiments, the front end 108 of the server system 106 receives and stores media items 129 in the media item repository 114.

Generic selection data for a plurality of users including a particular user of the media item repository 114 is collected and stored in the memory (306). The generic selection data (or click data 127) for a plurality of users (or community of users) is used to determine a particular user's interest, the current trend of news and a prediction of the particular user's news interests. The generic selection data (or click data 127) includes click type, selection duration, timestamps of the clicks, browser type used by the respective user and location of the respective user (308). Click type includes search clicks and browsing clicks. A search click is a click on a search result. A browse click is a click on any items that is not included in a search result. In some embodiments, the generic selection data does not include search selections. In some embodiments, each one of the selection statistics is given a respective weight (310). For example, a browse click may be more valuable than a search click.

A likelihood of a generic user selecting media items (e.g., 129, 126) associated with particular classes is determined (314). The likelihood of a generic user's selection is modeled as representing the trend of news and is used to predict a particular user's news interest. The click data (e.g., 128) and click distributions (e.g., 130) used to determine the likelihood of a generic users selection can correspond to any period of time. The likelihood of a generic user's selection for a recent period of time, such as the past day, represents the current trend of news. A class can be a category of media items (e.g., 126, 129) such as sports, health, world, local, business, entertainment, U.S., local and technology. A class can also be a type of media item (e.g., 126, 129) such as news articles, videos or sound recordings. For each category or type of media item, it is determined how likely it is that a generic user will select media items (e.g., 126, 129) belonging to the respective category. Stated in another way, the distribution of the generic user's clicks is determined with respect to each category. In some embodiments, the likelihood or prediction is represented as a metric such as a percentage, ratio or rating (e.g., high, medium, low). For example, a user is likely to select technology items 10% of the time.

The likelihood of a generic user selecting media items (e.g., 126) associated with particular classes is determined in accordance with click data (e.g., 127, 128) for a community of users. The community of users is typically a group of users relevant to the particular user. For example, for a user living in Mountain View, Calif. the relevant community of users may be those users living in the same city, the state of California or the United States. In some embodiments, the community of users includes all users of the server system 106. In some embodiments, statistics for a group of users having some shared characteristic (e.g., language, geographic region, interests, device, or IP address falling in certain ranges) are used. Thus, the current news trend for a particular user's location, device or some other characteristics can be determined.

Any type of click data (e.g., 127, 128) and click distributions (e.g., 130) can be used to determine the generic user's likelihood of selection. In some embodiments, the click distribution 130 of the community of users determines a generic user's likelihood of selecting media items (e.g., 126) associated with a respective category. For example, if 33% of the total number of clicks were for sports items, the generic user is likely to select sports items 33% of the time. In some embodiments, weighted click data is used to determine the generic user's likelihood of selection. For example, 3% of total number of clicks may be for health items but the determined likelihood of a generic user selecting a health item may be greater than 3% due to weighted click data. For example, search clicks may be given greater weight than browse clicks. Clicks with shorter selection duration may be given greater weight than clicks with longer selection duration. In some embodiments, only certain types of click data (e.g., 127, 128) are used to determine the generic user's likelihood of selection. For example, only clicks that have selection duration of a predefined period of time are considered or only browse clicks are considered.

In some embodiments, the click data 128 used to determine a generic user's likelihood of selection is stored in the community statistics database 118. In some embodiments, the media item recommendation module 110 uses the click data 128 stored in the community statistics database 118 to generate the likelihood of the generic user's selection. In some embodiments, the likelihood of the generic user's selection is stored in the community statistics database 118. In some embodiments, the generic user's likelihood of selection is generated, used and then disposed of without storing the prediction in the community statistics database 118.

A likelihood of the particular user selecting media items (e.g., 126) associated with the particular classes is determined (316). The likelihood of the particular user's selection is modeled as the particular user's interest and is used to influence what media items 126 are recommended to the particular user. In some embodiments, the likelihood of the particular user's selection of a respective category corresponds to the particular user's click distribution for the respective category. For example, if 13% of the user's clicks are for sports then the use is likelihood of interest of sports is 13%. For each category or type of media item (e.g., 126, 129), it is determined how likely it is that the particular user will select media items (e.g., 126, 129) belonging to the respective category. Stated in another way, the distribution of the particular user's clicks is determined for each category. In some embodiments, the likelihood or prediction is represented as a metric such as a percentage, ratio or rating (e.g., high, medium, low). For example, a user is likely to select world news items 10% of the time.

The click data (e.g., 127, 128) and click distributions (e.g., 130) used to determine the particular user's likelihood of selection can correspond to any number of time windows. Each time window can be of any duration. In some embodiments, the particular user's likelihood for each category is determined over multiple time windows of equal length. For example, the likelihood of the particular user's selection can be determined using click data (e.g., 127, 128) correspond to three time windows each having a duration of one week. In some embodiments, the click data (e.g., 127, 128) used to determine the particular user's likelihood of selection corresponds to a longer period of time than the period of time corresponding to the click data (e.g., 127, 128) used to generate the likelihood of the generic user's selection.

A class can be a category of media items (e.g., 126, 129) such as sports, health, world, local, business, entertainment, U.S., local and technology. A class can also be a type of media item (e.g., 126, 129) such as news articles, videos or sound recordings.

Any type of click data (e.g., 127, 128) can be used to determine the particular user's likelihood of selection. In some embodiments, the click distribution (e.g., 130 of the particular user determines the particular user's likelihood of selecting media items associated with a respective category. For example, if 20% of the particular user's clicks were for technology, the particular user is likely to selection technology items 20% of the time. In some embodiments, a combination of weighted click data is used to determine the particular user's likelihood of selection. For example, 5% of the particular user's clicks may have been for health items but the determined likelihood of the particular user selecting health items may be greater than 5% due to weighted click data. For example, search clicks may be given greater weight than browse clicks. Clicks with shorter selection duration may be given greater weight than clicks with longer selection duration. In some embodiments, only certain types of click data (e.g., 127, 128) is used to determine the particular user's likelihood. For example, only clicks that have selection duration of a predefined period of time are considered or only browse clicks are considered.

In some embodiments, the click data (e.g., 127, 128) over a predefined period of time such as days, weeks, months or years is used to determine the likelihood of a generic user's selection and the likelihood of the particular user's selection. For example, only clicks occurring in the past month or year may be used. In some embodiment, the likelihood of both the generic user and the particular user selecting media items associated with the particular classes is determined in accordance with selection data corresponding to the same time period (320). In some embodiments, the likelihood of both the generic user and the particular user selecting media items associated with the particular classes is determined in accordance with selection data (e.g., 127, 128, 130) corresponding to the some criteria such as location, spoken language, device or any combination of such criteria. In some embodiments, a particular user with little or no associated selection statistics is given a set of selection statistics corresponding to a generic user (318).

In some embodiments, the click data (e.g., 127, 128) used to determine a particular user's likelihood of selection is stored in the user profile database 120. In some embodiments, the media item recommendation module 110 uses the click data 127 for the particular user stored in the profile database 120 to generate the likelihood of the particular user's selection. In one embodiment, the likelihood of the particular user's selection is stored in the user profile database 120. In some embodiments, the particular user's likelihood of selection is generated, used and then disposed of without storing the prediction in the user profile database 120.

Figure 3B:
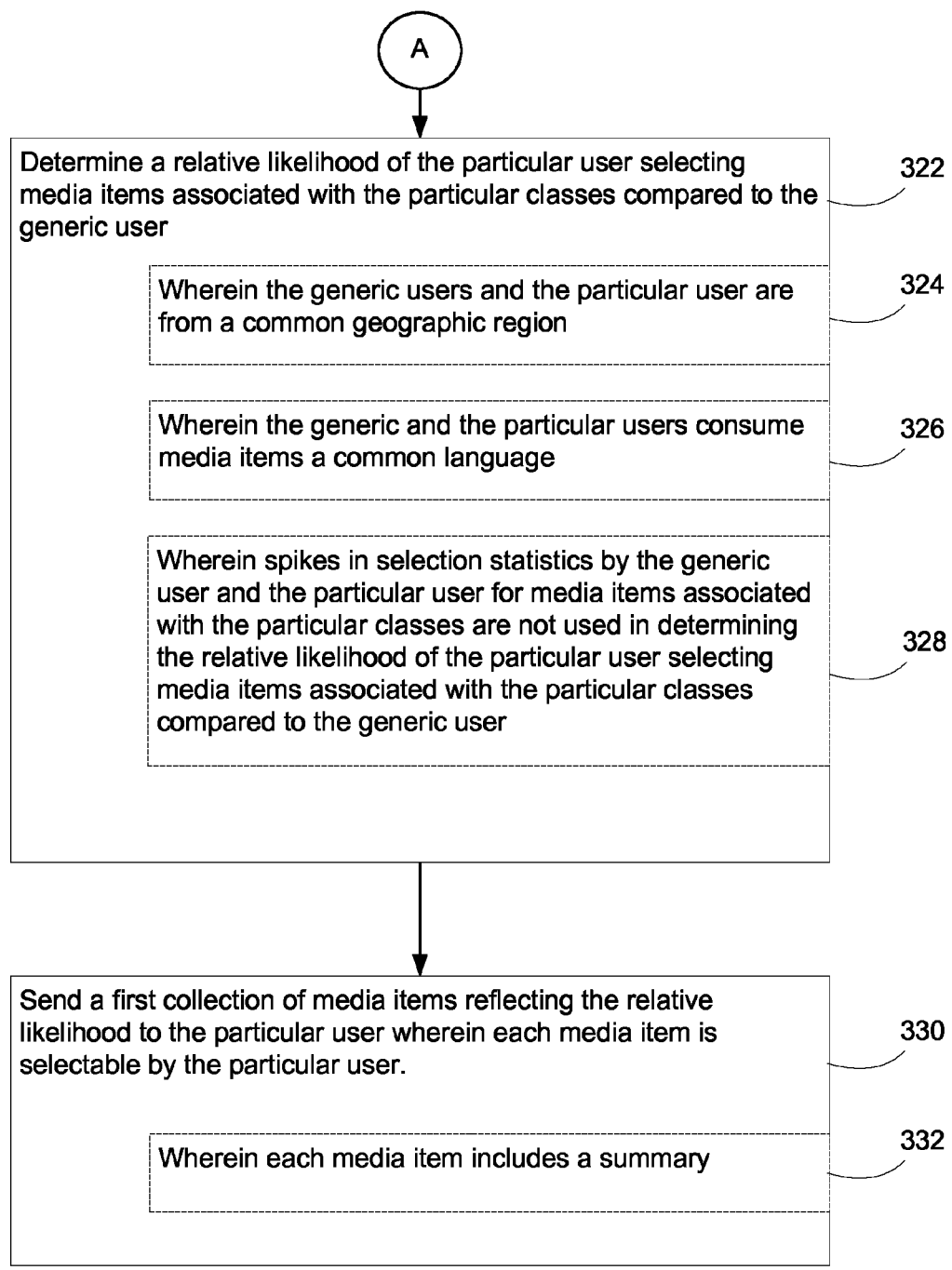

As shown in FIG. 3B, a relative likelihood of the particular user selecting media items (e.g., 126) associated with the particular classes compared to the generic user is determined (322). The relative likelihood is a prediction of the user's interests/selections and is determined based on the particular user's interests (i.e., the likelihood of the particular user's selection) and the current news trends (i.e., likelihood of the generic user's selection). For each category or type of media item (e.g., 126, 129), it is determined how likely it is that a particular user will select media items (e.g., 126) belonging to the respective category relative to a generic user. The relative likelihood is used to identify which categories of media items (e.g., 126) a particular user will most likely be interested in and to identify media items (e.g., 126) from each category to recommend to the particular user.

A relative likelihood takes into account both the particular user's news interests and the trend of news events. A user may select media items (e.g., 126, 129) relating to an exceptional event but the user may not be interested in the category associated with the selected media items. For example, a particular user who has many selections of Olympic related items during the Olympics may not have a strong preference for sports. Thus, after the Olympics are over the particular user may not want to view sports related items. On the other hand, the user may be interested in media items (e.g., 126, 129) relating to exceptional events. Recommending media items (e.g., 126) based on a relative likelihood ensures that media items (e.g., 126, 129) relating to exceptional events are still recommended to a user. For example, during the World Cup, media items relating to the World Cup may be recommended to the particular user even though the user is not normally interested in sports.

A relative likelihood based on a particular user's selection history also takes into account changes in the particular user's news interests. A particular user's news interests typically change over time. By using the particular user's selection history over a different time windows, the user's current interests can be determined. As an added benefit the user does not need to create an interest profile since the user's interests are determined from the user's selection history.

In some embodiments, the Bayesian model is used to predict a user's news interests. The determination is made in two parts. First, the particular user's interest in each respective category is determined based on the particular user's selection history. Second, a prediction of the distribution of the user's future clicks is determined based on the particular user's interests and current news trends.

A particular user's interest in each respective category is determined in two parts. First, the particular user's interest in each respective category is determined for several time periods. For example, in week 1 the particular user may have a 13% interest in sports and in week 2 the particular user may have a 30% interest in sports. Second, the particular user's determined interest (in each respective category) for several time periods is combined to compute an accurate measurement of the particular user's interests. For example, the particular user's interest in sports is determined based on the particular user's interest in sports in week 1 and week 2.

A particular user's interest for each category (or probability of selecting media items belonging to each category c) during a time period t is determined using the particular user's click distribution (e.g., 130). Stated in another way, the particular user's interest in each category is based on the particular user's click history. The particular user's interest is modeled as the probability of the particular user clicking on a media item in category $c_i$ and is represented as $p^t(click|category=c_i)$. Using a Bayesian rule, a particular user's interest in a respective category $c_i$ (or probability of selecting an item belonging to category c) at any given time t is represented by the equation, $$p^t(click | category = c_i) = \frac{p^t(category = c_i | click) p^t(click)}{p^t(category = c_i)}. \quad \text{(Equation 1)}$$

In Equation 1, the probability of a particular user clicking on a media item (e.g., 126, 129) of category $c_i$ at time t is represented by $p^t(category=c_i|click)$. For example, a particular user may click on health related media items 13% of the time. In Equation 1, $p^t(category=c_i|click)$ corresponds to the particular user's click distribution (e.g., 130) during time period t for the respective category In Equation 1, $p^t(category=c_i)$ is the probability that a media item (e.g., 126, 129) belongs to category $c_i$ during time period t. For example, in the last month, there is a 13% chance a given media item belongs to sports. In Equation 1, $p^t(category=c_i)$ corresponds to the proportion of media items published in category $c_i$ during time period t and to the trend of news during time period t. Media items relating to popular events are typically published in greater numbers and selected in greater numbers. In some embodiments, the value of $p^t(category=c_i)$ corresponds to the click distribution (e.g., 130) of a community of users. Thus, the click distribution (e.g., 130) for a community of users is used to approximate the proportion of media items for a category $c_i$ and the trend of news. The probability of the particular user clicking on any article at time t is represented by $p^t(click)$. The value of $p^t(click)$ is the same for all of the categories.

Equation 1, discussed above, computes the user's interest for a particular time period. To accurately predict a particular user's genuine interest in a category $c_i$, the particular user's interest ($p^t(click|category=c_i)$) in multiple time periods is combined as follows $$p^t(click | category = c_i) = \frac{1}{N} \sum_{i=1}^{M} n_i p^{t_i}(click | category = c_i).$$

In this equation, $$N = \sum_{i=1}^{M} n_i,$$

M represents the total number of time windows combined, i represents a respective time window and $n_t$ represents the total number of clicks made by the particular user during a respective time window. When expanded, the equation becomes, $$p^t(\text{click} | \text{category} = c_i) = \frac{\sum_{i=1}^{M} n_i \times \frac{p^{t_i}(\text{category} = c_i | \text{click}) p^{t_i}(\text{click})}{p^{t_i}(\text{category} = c_i)}}{\sum_{i=1}^{M} n_i}. \quad \text{(Equation 2)}$$

Any number of time windows M can be used and each respective time window i can be of any length. In Equation 2, $p^t(\text{click}|\text{category}=c_i)$ represents the particular user's interest in category $c_i$. The particular user's interest is computed for each category $c_i$ to create a distribution of the user's interests and to identify the user's categories of strong interest.

As discussed above, the prediction of a particular user's news interests is made in two parts. First, the particular user's interest in each respective is determined. Second, a prediction of the distribution of the user's future clicks is determined based on the particular user's interests and current news trends. The Bayesian rule is used to predict the user's future click distribution, $$p^0(\text{category} = c_i | \text{click}) = \frac{p^0(\text{click} | \text{category} = c_i) p^0(\text{category} = c_i)}{p^0(\text{click})}. \quad \text{(Equation 3)}$$

In the equation, $p^0(\text{category}=c_i|\text{click})$ is the user's predicted future click distribution for category $c_i$ and $p^0(\text{category}=c_i)$ is the click distribution (e.g., 130) of a generic user (or community of users) for media items belonging category $c_i$ during a recent time period (e.g., in the past hour). $p^0(\text{click}|\text{category}=c_i)$ is the particular user's interest in category $c_i$ computed using Equation 2. Substituting $p^0(\text{click}|\text{category}=c_i)$ (determined from Equation 2) into Equation 3, the equation to predict a user's future click distribution becomes $$p^0(\text{click} | \text{category} = c_i) = \frac{p^0(\text{category} = c_i) \times \sum_{i=1}^{M} n_i \times \frac{p^{t_i}(\text{category} = c_i | \text{click})}{p^{t_i}(\text{category} = c_i)}}{\sum_{i=1}^{M} n_i}. \quad \text{(Equation 4)}$$

In some embodiments, the prediction of the particular user's interest is adjusted by adding clicks to the particular user's click history or click distribution (e.g., 130). In some embodiments, the distribution of additional clicks corresponds to the distribution of clicks of a community of users (e.g., a generic user) during the most recent time period (or any time period). For example, if in the last 2 hours 10% of the clicks were for entertainment related media items then 10% of the additional clicks will be entertainment clicks. Any number of generic clicks can be added to a particular user's click history. Furthermore, any type or combination of clicks can be added to the particular user's click history. For example, only search clicks may be added. The adjustment ensures that media items recommended to the particular user will be influenced by the selections by the community of users. As a result, media items (e.g., 126) relating to exceptional events will be recommended to the user even though the user is not normally interested in category the media item is associated with. If a particular user has made very few clicks, the user's interests and media items recommended to the user (e.g., 126) will be largely influenced by the interests of the community of users. The adjusted equation that includes additional clicks in the particular user's click history is represented by, $$p^0(\text{click} | \text{category} = c_i) = \frac{p^0(\text{category} = c_i) \times \left( \sum_{i=1}^{M} \left( n_i \times \frac{p^{t_i}(\text{category} = c_i | \text{click})}{p^{t_i}(\text{category} = c_i)} \right) + G \right)}{\sum_{i=1}^{M} n_i + G}$$

(Equation 5), where N is the total number of clicks made by the particular user and G is the total number of generic clicks added. It is noted that any model for determining a relative likelihood can be used.

Using Equation 5, a prediction of a particular user's interest or click distribution is computed for each category $c_i$ to create a distribution of the user's predicted interests. From the prediction of the particular user's interest, the user's categories of strong interest are identified. Media items (e.g., 126) are recommended to a user based on the user's predicted interests. For example, if the predicted probability of a user selecting sports items is 20% then 20% of the media items recommended to the user will be for sports items.

In some embodiments, the generic users and particular user are from a same geographic region (324). In some embodiments, the generic and particular users consume media items (e.g., 126, 129) that include a same language (326). In some embodiments, spikes in selection statistics by the generic user and the particular user for media items (e.g., 126, 129) associated with the particular classes are not used in determining the relative likelihood of the particular user selecting media items associated with the particular classes compared to the generic user (328).

After the particular user's relative likelihood of selecting media items (e.g., 126, 129) associated with particular classes is determined, a first collection of media items (e.g., 126) reflecting the relative likelihood is sent to the particular user (330). Each media item (e.g., 126) sent to the particular user is selectable by the particular user. In some embodiments, the particular user's relative interest in each category determines the likelihood that media items (e.g., 126, 129) associated with a respective category will be sent to the user. For example, if the user's relative interest in technology is 30% then there is a 30% chance a media item (e.g., 126) from technology will be selected. In an alternate embodiment, only media items (e.g., 126, 129) from the top N categories are selected where N can be any number greater than one. Once one or more categories are selected, media items (e.g., 126) associated with the one or more categories are selected. In some embodiments, the media items (e.g., 126) with the highest ranks are selected. The criteria for ranking pages can be any criteria such as page ranks, click rates (e.g., the total number of users who clicked on an item divided by the number of times the item was displayed to users), page views, relevance metrics, time stamps and the like. In some embodiments, the number of media items sent to a user is determined by the user's custom preferences. Optionally, media items (e.g., 126) are sent to the particular user as part of a content feed.

Figure 3C:
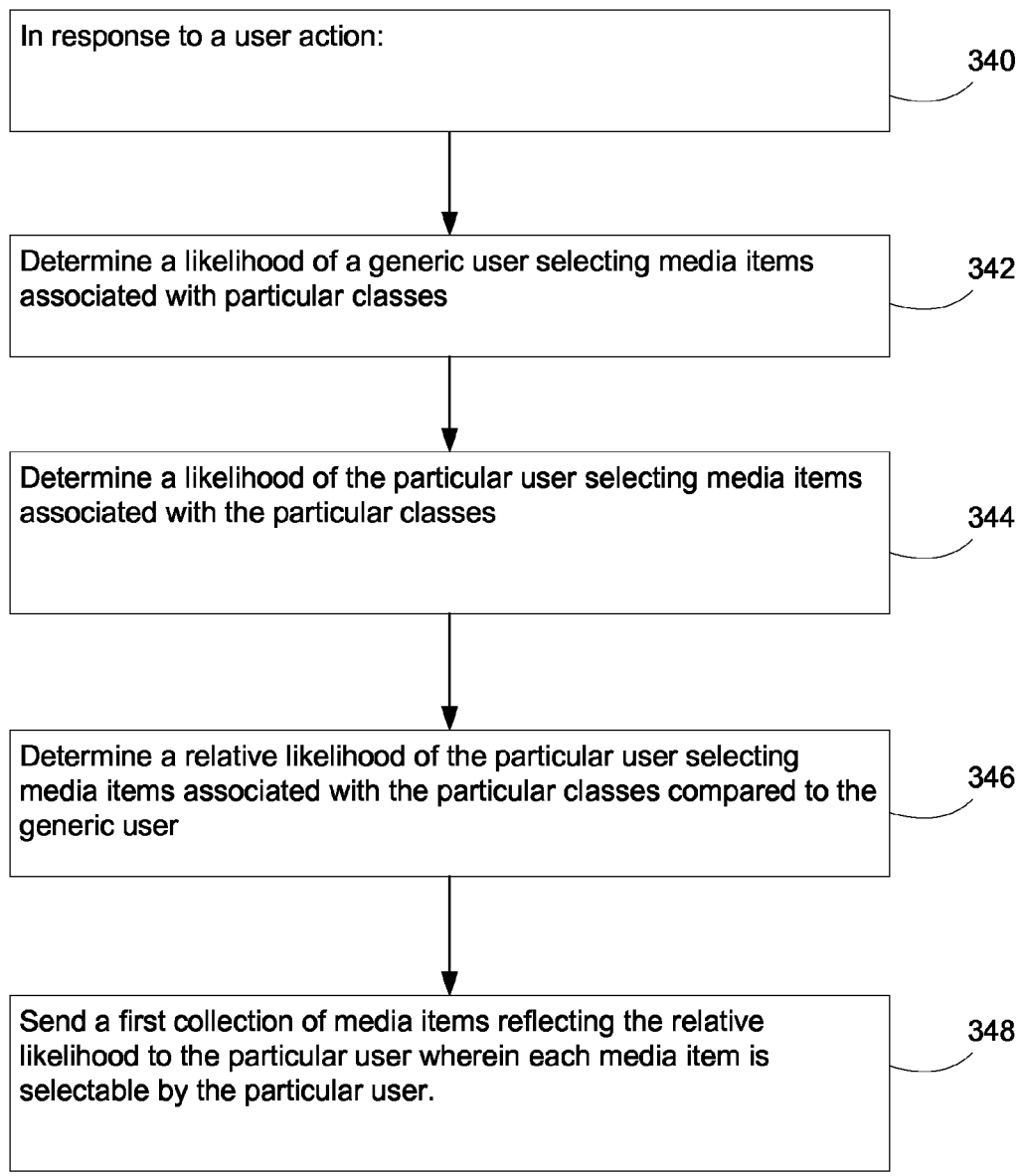

FIG. 3C illustrates a process for recommending media items to a user. In response to a user action (340) a likelihood of a generic user selecting media items (e.g., 126) associated with particular classes is determined (342). In some embodiments, the user action is a request for media items (e.g., 126) by selecting an icon or link. For example, a user selects an icon and without any further user interaction, media items (e.g., 126) are recommended to the user. In some embodiments, the user action consists of entering the URL of a webpage containing recommended media items (e.g., 126). A likelihood of the particular user selecting media items (e.g., 126) associated with the particular classes is determined (344). The relative likelihood of the particular user selecting media items (e.g., 126) associated with the particular classes compared to the generic user is determined (346). A first collection of media items (e.g., 126) reflecting the relative likelihood is sent to the particular user (350). The media items (e.g., 126) sent to the particular user are selectable by the particular user.

Figure 4A:
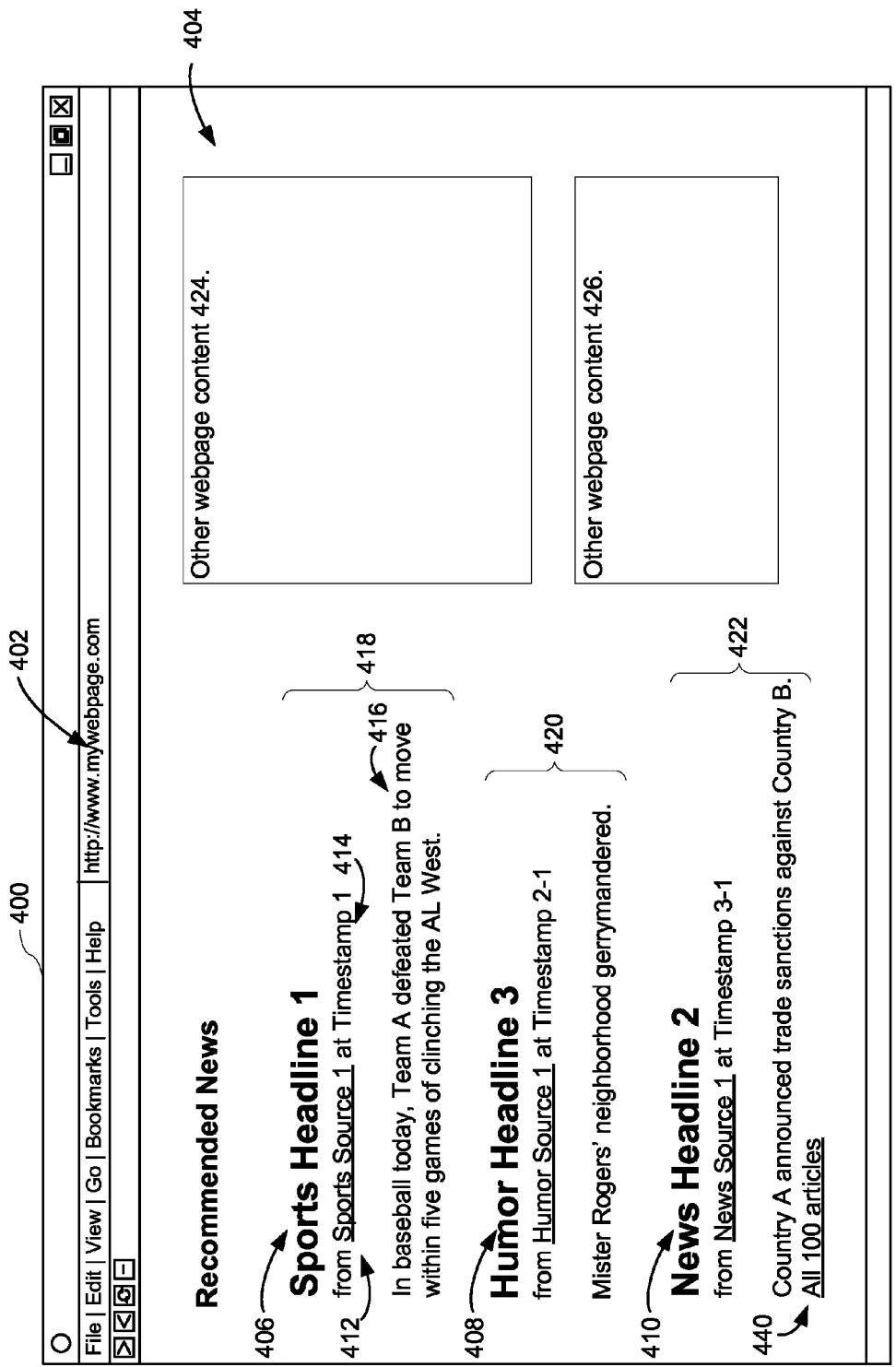
FIGS. 4A-4B are exemplary screenshots of a web browser window displaying media item recommendations according to some embodiments of the invention.

Attention is now directed toward FIG. 4A which is an exemplary screenshot of a web browser window 400 presenting a webpage that includes a user interface 404, in accordance with some embodiments of the invention. The web browser 400 can be any type of browser application that permits a user to display and interact with web pages or other documents or information. The web browser's user interface includes a URL field 402 for entering the URL of any webpage that a user wants to display, as well as for displaying the URL of the webpage currently being displayed. The user may access a webpage displaying recommended news by entering in the URL field 402 the URL associated with a website that shows recommended news items. In some embodiments, a user access a webpage of a feed reader that retrieves recommended news items.

The user interface 404 includes an ordered list of recommended media items 418, 420 and 422. In some embodiments, items in the ordered list are ordered according to timestamps, page ranks or some combination of values associated with the media items (e.g., 418, 420 and 422). In some embodiments, items in the ordered list are ordered in accordance with a user's interest in the respective categories of media items (e.g., 418, 420 and 422) that the items belong to.

Each media item (e.g., 418, 420 and 422) includes a link to the full content associated with those contents (e.g., 406, 408 and 410). The link may be activated by a user clicking on the headline of the content item, or by clicking on a link icon (not shown in FIG. 4A). Activation of the link typically causes the browser to open a new browser window or tab and to download and display the document (if any) located at the location (e.g., URL) specified by the link.

In some embodiments, each media item (e.g., 418, 420 and 422) includes a headline (e.g., 406), a source (e.g., 412), a timestamp or date (e.g., 414), and/or a portion of the content (e.g., 416). In some embodiments, each media item (e.g., 418, 420 and 422) includes a link to all media items related to the respective media item. In addition to displaying the recommended media items (e.g., 418, 420 and 422), the user interface 404 may include web page content 424 and 426 that may be unrelated to the recommended media items (e.g., 418, 420 and 422).

Figure 4B:
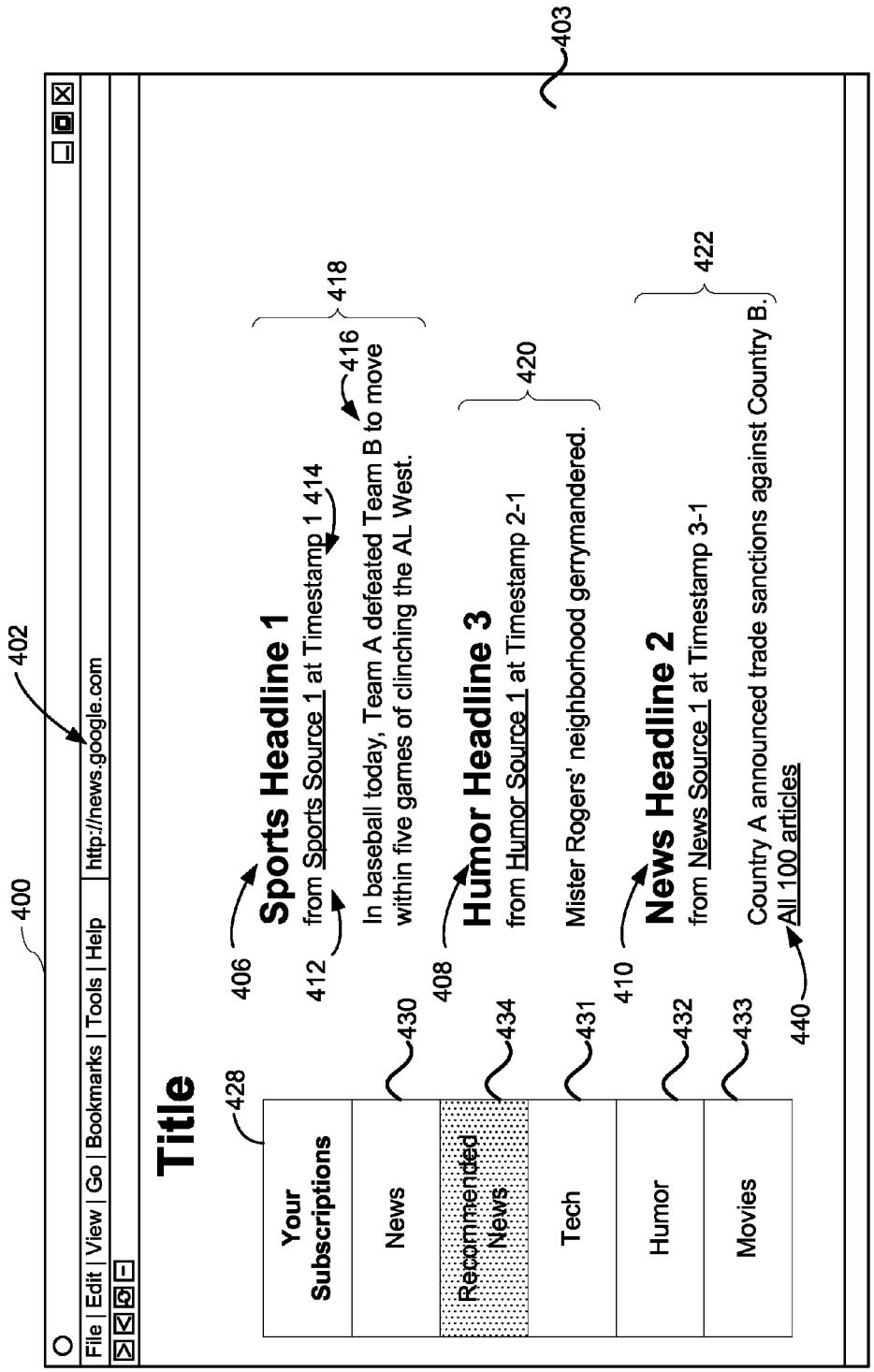

FIG. 4B is a schematic screenshot of a web browser 400 presenting a webpage that includes a user interface 403, in accordance with some embodiments. The user interface 403 includes a list 428 of labels associated with categories of media items (e.g., 430, 431, 433, 434, 432). Exemplary labels shown in FIG. 4B include "News" 430 and "Humor" 432. Each label or folder includes an ordered list of media items (e.g., 418, 420 and 422). For example, in FIG. 4B, the "Recommended News" label 434 has been selected by the user, as indicated by the shaded background. In this example, media items associated with the "Recommended News" label, including items 418, 420 and 422, are listed in an ordered list.

When a user selects a different label, media items associated with the respective category are displayed. If a user selected the "news" label 430, an ordered list would display media items associated with "news" label 430. Also, the user interface 403 would indicate that the "News" label 430 was selected by, for example, displaying it with a shaded background. In this example, the background for "Recommended News" label 434 would no longer be shaded after the user selected "News" label 430.

Figure 5:
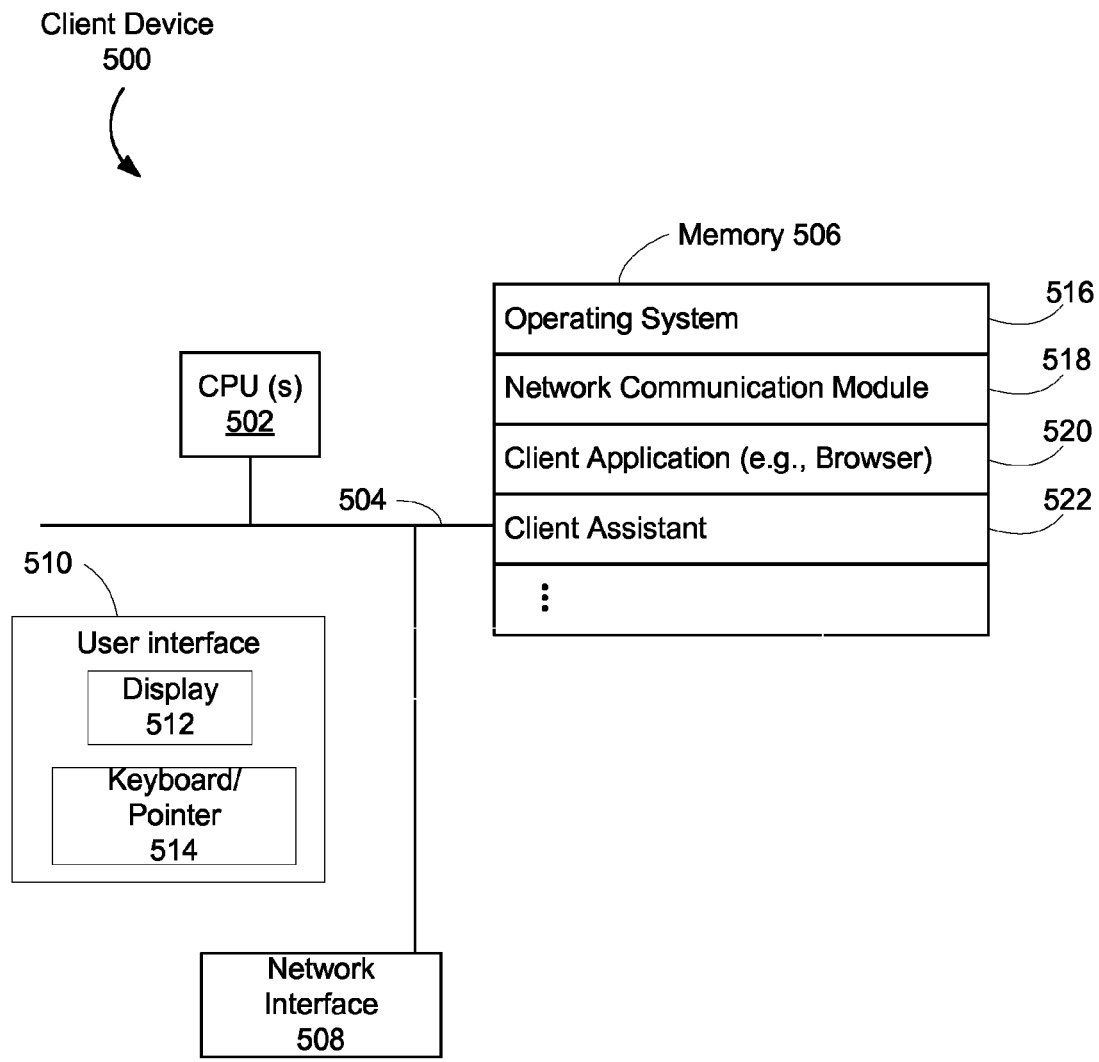
FIG. 5 is a block diagram illustrating the structure of an exemplary client device according to some embodiments of the invention.

FIG. 5 is a block diagram illustrating a client device 500, in accordance with one embodiment of the present invention. The client device 500 typically includes one or more processing units (CPU's) 502, one or more network or other communications interfaces 508, memory 506, and one or more communication buses 504 for interconnecting these components. The client device 500 may also include a user interface comprising a display device 512 and a keyboard and/or mouse (or other pointing device) 514. Memory 506 includes high-speed random access memory, such as DRAM, SRAM, DDR RAM or other random access solid state memory devices; and may include non-volatile memory, such as one or more magnetic disk storage devices, optical disk storage devices, flash memory devices, or other non-volatile solid state storage devices. Memory 506 may optionally include one or more storage devices remotely located from the CPU(s) 502. Memory 506, or alternatively the non-volatile memory device(s) within memory 506, comprises a computer readable storage medium. In some embodiments, memory 506 or the computer readable storage medium of memory 506 store the following programs, modules and data structures, or a subset thereof:
- an operating system 516 that includes procedures for handling various basic system services and for performing hardware dependent tasks;
- a network communication module 518 that is used for connecting to other computers via the one or more communication network interfaces 508 (wired or wireless) and one or more communication networks, such as the Internet, other wide area networks, local area networks, metropolitan area networks, and so on;
- a client application (or instructions) 520, such as a web browser application or feed reader, for receiving a user request for media items 126 and rendering the requested media items 126 on a computer monitor or other user interface device; and
- a client assistant module (or instructions) 522, to monitor user activities and sends click data 127 to the server system 106.

Each of the above identified elements may be stored in one or more of the previously mentioned memory devices, and each of the modules or programs corresponds to a set of instructions for performing a function described above. The above identified modules or programs (i.e., sets of instructions) need not be implemented as separate software programs, procedures or modules, and thus various subsets of these modules may be combined or otherwise re-arranged in various embodiments. In some embodiments, memory 506 may store a subset of the modules and data structures identified above. Furthermore, memory 506 may store additional modules and data structures not described above.

Although FIG. 5 shows a client system, FIG. 5 is intended more as functional description of the various features which may be present in a set of clients than as a structural schematic of the embodiments described herein. In practice, and as recognized by those of ordinary skill in the art, items shown separately could be combined and some items could be separated. For example, some items (e.g., client application 520 and client assistant 522) shown separately in FIG. 5 could be implemented on a single client and single items could be implemented by one or more clients.

Figure 6:
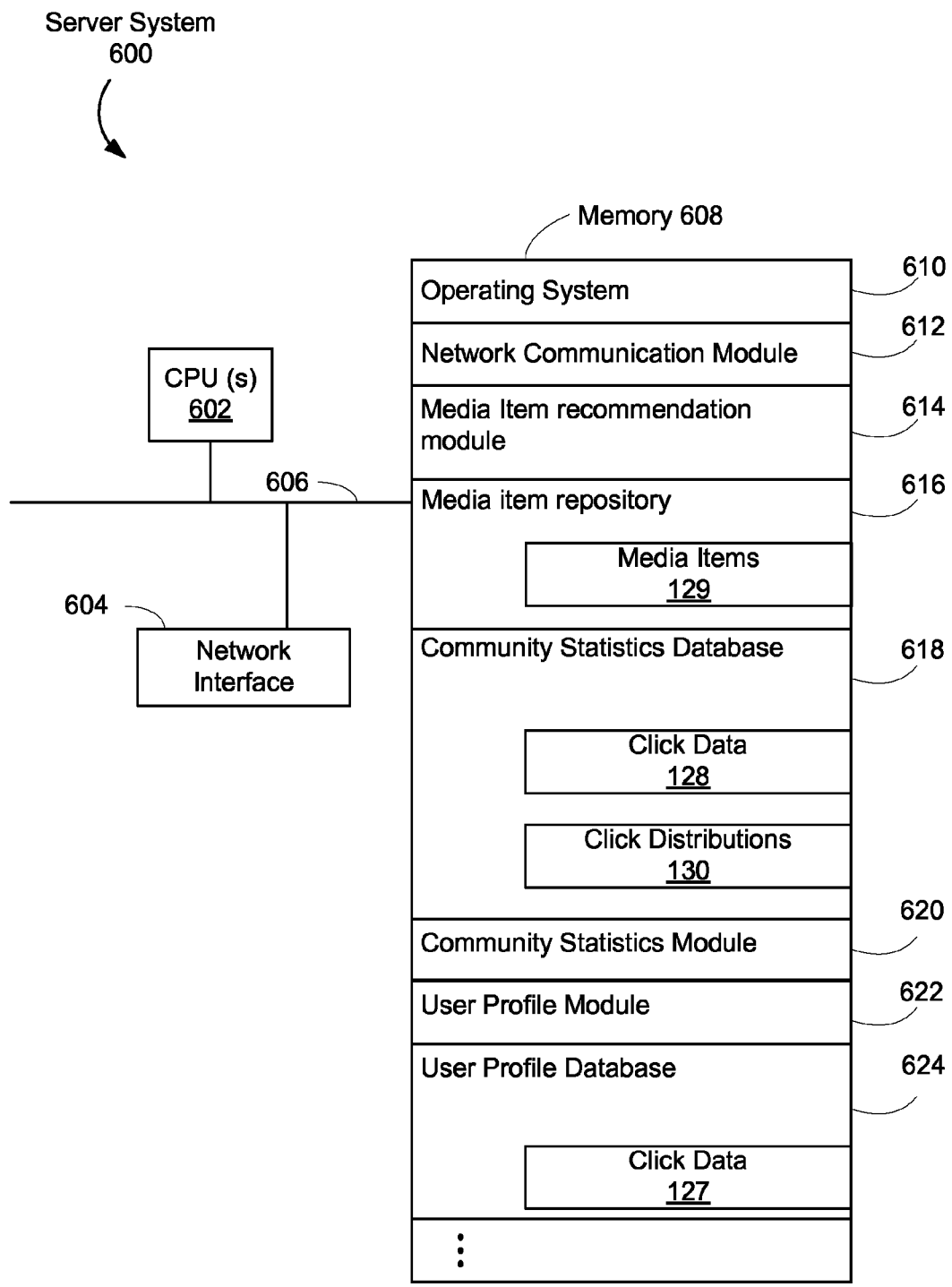
FIG. 6 is a block diagram illustrating the structure of an exemplary server system according to some embodiments of the invention.

FIG. 6 is a block diagram illustrating a server system 600, in accordance with one embodiment of the present invention. The server 600 typically includes one or more processing units (CPU's) 602, one or more network or other communications interfaces 604, memory 608, and one or more communication buses 606 for interconnecting these components. Memory 608 includes high-speed random access memory, such as DRAM, SRAM, DDR RAM or other random access solid state memory devices; and may include non-volatile memory, such as one or more magnetic disk storage devices, optical disk storage devices, flash memory devices, or other non-volatile solid state storage devices. Memory 608 may optionally include one or more storage devices remotely located from the CPU(s) 602. Memory 608, or alternatively the non-volatile memory device(s) within memory 608, comprises a computer readable storage medium. In some embodiments, memory 608 or the computer readable storage medium of memory 608 store the following programs, modules and data structures, or a subset thereof:

- an operating system 610 that includes procedures for handling various basic system services and for performing hardware dependent tasks;
- a network communication module 612 that is used for connecting to other computers via the one or more communication network interfaces 604 (wired or wireless) and one or more communication networks, such as the Internet, other wide area networks, local area networks, metropolitan area networks, and so on;
- a media item recommendation module 614 that uses information stored in the community statistics database 618 and the user profile database 624 to recommend media items 126 that a user is likely to be interested in;
- a media item repository 616 to store media items 129 including news articles, videos, images, sound recordings and links to content stored elsewhere;
- a community statistics database 618 to store the click data 128 and the click distributions 130 for a community of users;
- a community statistics module 620 that uses the click data 127 for one or more users in the user profile database 624 to generate the click data 128 and the click distributions 130 for a community of users;
- a user profile module 622 to generate and manage user profiles to be stored in the user profile database 624; and
- a user profile database 624 that stores user profiles for a users or groups of users; the profiles including the click data 127 for each respective user.

Each of the above identified elements may be stored in one or more of the previously mentioned memory devices, and each of the modules or programs corresponds to a set of instructions for performing a function described above. The above identified modules or programs (i.e., sets of instructions) need not be implemented as separate software programs, procedures or modules, and thus various subsets of these modules may be combined or otherwise re-arranged in various embodiments. In some embodiments, memory 608 may store a subset of the modules and data structures identified above. Furthermore, memory 608 may store additional modules and data structures not described above.

Although FIG. 6 shows a server, FIG. 6 is intended more as a functional description of the various features which may be present in a set of servers than as a structural schematic of the embodiments described herein. In practice, and as recognized by those of ordinary skill in the art, items shown separately could be combined and some items could be separated. For example, some items (e.g., media item recommendation module 614, media item repository 616, user profile module 622) shown separately in FIG. 6 could be implemented on single servers and single items could be implemented by one or more servers. The actual number of servers used to implement the server system 600 and how features are allocated among them will vary from one implementation to another, and may depend in part, for example, on the amount of data traffic that the system must handle during peak usage periods as well as during average usage periods.

Each of the methods described herein may be governed by instructions that are stored in a computer readable storage medium and that are executed by one or more processors of one or more servers. Each of the operations shown in FIGS. 3A-3C may correspond to instructions stored in a computer memory or computer readable storage medium.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated.

What is claimed is:

1. A method, comprising:
   at a server system,
   obtaining first click distribution data for a first subset of a plurality of media items, each of the media items being associated with one or more item categories;
   determining, from the first click distribution data, likelihood of a generic user selecting media items associated with at least a subset of the item categories;
   obtaining second click distribution data from a particular user for a second subset of the plurality of media items;
   determining, based on differences between the first and second click distribution data for respective item categories, an adjusted likelihood of the particular user selecting media items associated with the at least a subset of the item categories; and
   transmitting to a client device associated with the particular user recommendations related to a third subset of the plurality of media items based on the adjusted likelihood and respective item categories of the third subset of the plurality of the media items.

2. The method of claim 1, wherein the generic user and the particular user come from a common geographic region, or consume media items in a common language.

3. The method of claim 1, further comprising:
including, in the second click distribution data, a set of selection statistics corresponding to a generic user, when the second click distribution data from the particular user is less than a predefined amount.

4. The method of claim 1, wherein the first and second click distribution data include click distribution data corresponding to a same predetermined time period.

5. The method of claim 1, wherein the first and second click distribution data include information identifying at least one of: click type, selection duration, timestamp of clicks, browser type, or location of the particular user.

6. The method of claim 1, wherein determining the adjusted likelihood of the particular user selecting media items associated with the at least a subset of the item categories comprising:
excluding from consideration, a spike in selection statistics for selecting one or more media items associated with a respective item category by the generic user and the particular user.

7. The method of claim 1, wherein the particular user consists of a group of users having a common characteristic.

8. A server system, comprising:
memory;
one or more processors;
one or more programs stored in the memory and configured for execution by the one or more processors, the one or more programs including:
instructions for obtaining first click distribution data for a first subset of a plurality of media items, each of the media items being associated with one or more item categories;
instructions for determining, from the first click distribution data, likelihood of a generic user selecting media items associated with at least a subset of the item categories;
instructions for obtaining second click distribution data from a particular user for a second subset of the plurality of media items;
instructions for determining, based on differences between the first and second click distribution data for respective item categories, an adjusted likelihood of the particular user selecting media items associated with the at least a subset of the item categories; and
instructions for transmitting to a client device associated with the particular user recommendations related to a third subset of the plurality of media items based on the adjusted likelihood and respective item categories of the third subset of the plurality of the media items.

9. The system of claim 8, wherein the generic user and the particular user come from a common geographic region, or consume media items in a common language.

10. The system of claim 8, wherein the one or more programs further comprising instructions for:
including, in the second click distribution data, a set of selection statistics corresponding to a generic user, when the second click distribution data from the particular user is less than a predefined amount.

11. The system of claim 8, wherein the first and second click distribution data include click distribution data corresponding to a same predetermined time period.

12. The system of claim 8, wherein the first and second click distribution data include information identifying at least one of: click type, selection duration, timestamp of clicks, browser type, or location of the particular user.

13. The system of claim 8, wherein determining the adjusted likelihood of the particular user selecting media items associated with the at least a subset of the item categories comprising:
excluding from consideration, a spike in selection statistics for selecting one or more media items associated with a respective item category by the generic user and the particular user.

14. The system of claim 8, wherein the particular user consists of a group of users having a common characteristic.

15. A non-transitory computer readable storage medium storing one or more programs, the one or more programs comprising instructions, which when executed by a computer system with one or more processors, cause the computer system to:
obtain first click distribution data for a first subset of a plurality of media items, each of the media items being associated with one or more item categories;
determine, from the first click distribution data, likelihood of a generic user selecting media items associated with at least a subset of the item categories;
obtain second click distribution data from a particular user for a second subset of the plurality of media items;
determine, based on differences between the first and second click distribution data for respective item categories, an adjusted likelihood of the particular user selecting media items associated with the at least a subset of the item categories; and
transmit to a client device associated with the particular user recommendations related to a third subset of the plurality of media items based on the adjusted likelihood and respective item categories of the third subset of the plurality of the media items.

16. The non-transitory computer readable storage medium of claim 15, wherein the generic user and the particular user come from a common geographic region, or consume media items in a common language.

17. The non-transitory computer readable storage medium of claim 15, wherein the one or more programs further comprising instructions which causes the computer system to:
include, in the second click distribution data, a set of selection statistics corresponding to a generic user, when the second click distribution data from the particular user is less than a predefined amount.

18. The non-transitory computer readable storage medium of claim 15, wherein the first and second click distribution data include click distribution data corresponding to a same predetermined time period.

19. The non-transitory computer readable storage medium of claim 15, wherein the first and second click distribution data include information identifying at least one of: click type, selection duration, timestamp of clicks, browser type, or location of the particular user.

20. The non-transitory computer readable storage medium of claim 15, wherein determining the adjusted likelihood of the particular user selecting media items associated with the at least a subset of the item categories comprising:
excluding from consideration, a spike in selection statistics for selecting one or more media items associated with a respective item category by the generic user and the particular user.

* * * * *

UNITED STATES PATENT AND TRADEMARK OFFICE
CERTIFICATE OF CORRECTION

| | | |
|---|---|---|
| PATENT NO. | : 8,682,826 B2 | Page 1 of 1 |
| APPLICATION NO. | : 13/556043 | |
| DATED | : March 25, 2014 | |
| INVENTOR(S) | : Peter Dolan et al. | |

It is certified that error appears in the above-identified patent and that said Letters Patent is hereby corrected as shown below:

On the Title Page: Insert -- Related U.S. Application Data

(63) Continuation of application No. 12/562,953, filed on Sep. 18, 2009, now Pat. No. 8,229,873. --

Signed and Sealed this
Third Day of June, 2014

Michelle K. Lee
*Deputy Director of the United States Patent and Trademark Office*